Patented Mar. 2, 1943

2,312,431

UNITED STATES PATENT OFFICE 2,312,431

OIL-MODIFIED COMPOSITION AND ITS PREPARATION

Virgil E. Meharg and Arthur P. Mazzucchelli, Bloomfield, N. J., assignors to Bakelite Corporation, a corporation of New Jersey No Drawing. Application August 18, 1938, Serial No. 225,572

11 Claims. (Cl. 260—19)

This invention relates to friction elements such as brake linings, clutch facings and the like and especially to dry-processed molded friction linings.

Heretofore dry-processed molded linings for brakes have been made principally from mixtures of powdered rubber, or alternatively from finely pulverized rubber scrap filled with short asbestos fibers and sulphur. Usually these ingredients have been mixed first to make up a homogeneous mass by sifting, stirring or tumbling and then vulcanized while being molded under heat and pressure to yield friction elements in the form of brake lining segments. Although synthetic resins have been tried as substitutes for rubber in the preparation and compounding of friction and similar composition surfaces, the resins heretofore available have found but limited application. This can be attributed to the properties of the resinous binder itself or to changes which occur in the molded element under use that impair the frictional characteristics. The resinous bond has necessitated the incorporation of one or more friction-supplementing ingredients, and for this purpose liquid agents such as organic plasticizers, fatty oils, or pitches have been suggested to attain the desired characteristics. Their introduction, however, has caused other difficulties, one of the most troublesome being that the resin so modified has not been available in the dry powdery condition required for dry mixing and molding of friction linings. Moreover, the addition of such friction-supplementing ingredients to a resin has been accompanied by undesirable changes in the molding properties of the resin itself, due to the formation of a wet or even liquid mixture which is difficult to use in the customary machines adapted for press-molding a powdered or preformed resin and has caused failure of the final molded product when in use.

On the other hand, the incorporation of dry modifying agents in synthetic resins to give a dry moldable composition for the fabrication of friction materials has proven unsatisfactory because of the tendency of these added materials to separate out from the resin. Frequently these addition substances are squeezed out on the molded surface of the friction element where they affect the friction surface adversely and impair its gripping characteristics. This results in uneven braking action and makes numerous and frequent adjustments of the various brake bands a prerequisite for safe driving; and, moreover the shortened life of the braking surface necessitates frequent renewals of the brake lining.

It is an object of this invention to overcome these difficulties; and it provides a modified resinous binder convertible to a dry, non-sintering comminuted state which can be readily added to dry comminuted fillers and/or fibres to yield a homogeneous molding mixture readily molded under heat and pressure into durable, wear resistant friction elements. The dry powdered form of the modified resin is herein intended to define a product which remains in its finely comminuted form without caking or sintering when stored under normal conditions or when mixed with a filler in a ball mill or similar machine.

In general, the process of this invention embodies the preparation of a friction material moldable under the action of heat and pressure to an infusible form and prepared from the reaction product of a phenol and an aldehyde condensed under acid conditions to yield a resin which is subsequently modified by incorporating therewith a vegetable drying or semi-drying oil, such as linseed, tung, oiticici, soya bean, castor oil and the like, before the addition of filling materials. Unexpectedly it has been found that by first causing a condensation of phenol or a substituted phenol and an aldehyde, as formaldehyde in the presence of an acid catalyst and then adjusting the hydrogen ion concentration of the reaction product to between 2.3 and 8.25, preferably between 3 and 4, a resin is obtained which can be combined with as much as 50% of a vegetable oil to yield a homogeneous product in grindable solid form that on fusion gives a melt with no substantial separation of the resin and the oil. In general, although the pH range specified yields highly desirable oil-modified resin compositions, somewhat lower pH values can be used when substituted phenols, as cresols, xylenols and higher alkyl or aryl substituted phenols, are used in preparing the resin or when relatively small amounts of oil are to be incorporated in the resinous mixture.

The phenolic resinous material which has been found most useful for the preparation of grindable oil-modified resins is that prepared by condensing a phenol with formaldehyde or acetaldehyde in the presence of an acid catalyst and in such proportions that for each molecular weight of phenol there is used for the condensation not more than 0.8 mol of formaldehyde. The phenol-formaldehyde condensation is carried out in the usual manner; that is, a mixture of phenol, formaldehyde and acid catalyst is boiled under a reflux condenser until analysis indicates that substantially all the formaldehyde has combined with the phenol. The hydrogen ion concentration of the condensation mixture is adjusted as stated above, and then the water and other volatile constituents, such as unreacted phenol or formaldehyde, are distilled off from the resin until a hard brittle resin is obtained, substantially free from materials volatile at temperatures approximating or in excess of 100° C. at atmospheric pressure and having a melting point of about 70-95° C.

To the molten, dehydrated resin about 20% of its weight of an oil modifier is added, and the oil-resin mixture heated until a clear bead is obtained on cooling. This normally requires heating to temperatures between 200° C. and 300° C. A second and third portion of oil can be added in a similar manner, if desired, until an amount of oil has been added corresponding to not greater than 40 to 50% of the resin. In this manner, a hard, clear, brittle, grindable resin is obtained, having a melting point of between about 80-110° C. and readily grindable to pass 200-300 mesh screen. The ground material showed substantially no caking or sintering at an ordinary temperature of 25° C.

For the manufacture of friction elements. 15-25% of the dry powdered resin, containing about 2-15% (based on resin) of hexamethylene tetramine or equivalent hardening agent, as anhydro formaldehyde aniline or an excess formaldehyde phenol resin, is thoroughly mixed, for example by tumbling with about 15-20% of a reenforcing agent, such as barytes, clay or carbon, and about 55-75% of dry asbestos fibers. This mixture is readily molded under heat and pressure to any desired shape, say at pressure of about 800-2000 lbs. sq. in. and temperatures of about 125-170° C.

Products molded in accordance with the above process are exceptionally durable, resistant to such wear as accompanies abrasion, and frequently exhibit only 35% of the wear found in a friction element fabricated from an unmodified phenolic resin; these molded products have demonstrated a life of at least 15,000 miles or more under average service. They furthermore exhibit exceptional frictional stability, absence of fading and scoring and have properties of resiliency and toughness which practically eliminate any tendency of the brakes to squeal. In addition these molded brake linings have excellent water and oil resistance and particularly under conditions of relatively high humidity, the brake surface remains free from adsorbed moisture. Thus, the molded article exhibits a water repellance which eliminates danger of brake seizure.

The following examples are given in order to illustrate the preparation of specific oil-modified resins for use in the fabrication of friction elements:

*Example 1.*—5000 parts of phenol, 3000 parts of a 37% aqueous solution of formaldehyde and 50 parts of an 85% aqueous solution of phosphoric acid are reacted with constant agitation under reflux conditions at atmospheric pressure for about 6 hours to combine practically all the formaldehyde as indicated by titration of a sample of the mixture with sodium sulphite. The aqueous layer has a pH at the end of the reaction of about 1.6, and this is increased to about 3.8 by the addition of 140 parts of $Ba(OH)_2.8H_2O$ dissolved in 500 parts of water; the volatiles are distilled off at atmospheric pressure by heating to a temperature of 170° C. over a period of about 1½ hours. 1000 parts of raw linseed oil are added and the oil-resin mixture heated with constant agitation over a period of about 1½ hours to 300° C. when a practically clear mixture is obtained. After being held at this temperature for 15 minutes, 1000 parts more of linseed oil are added, the mixture is heated with constant agitation to 280° C. and it is held at this temperature for 10 minutes until clear. Any residual unreacted phenol can be removed by heating under a vacuum of 25 inches; and the mixture is maintained at 280-300° C. under a vacuum of 28 inches for 35 minutes until a sample becomes quite brittle on cooling; the resin is poured into cooling pans. About 6660 parts by weight of an oil-modified resin are obtained in this way containing about 30% of oil and melting at 90° C. The product can be ground to a 200-300 mesh powder which is substantially free from caking or sintering at 35-38° C.

Other hydrogen ion concentrations may be used; at a pH of 3.0, however, the resin reaction becomes sensitive and under more alkaline conditions the resin becomes progressively darker in color, although a usable resin has been prepared at a pH of 8.25. Other acid catalysts, such as oxalic or phenol sulphonic acid can be used to obtain the desired pH control. Likewise, other alkaline reagents can be substituted to give the desired pH range, but those forming non-hydrolyzable salts with the acid catalyst used are preferred; among such reagents are the alkaline earths, calcium or barium hydroxide. With strong mineral acids such as sulphuric and hydrochloric, the strong alkali hydroxides, such as sodium or potassium hydroxide can be used.

Various oils such as raw perilla or soya bean oil can also be used; and furthermore, the oils can be added at the beginning of the resin-forming reaction but partial decomposition of the oil is liable to occur during the reaction. Moreover, the formaldehyde ratio can be varied from about 0.8 mol to as little as 0.575 mol of formaldehyde per mol of phenol; however, the miscibility of the oil and the resin varies inversely with the proportion of formaldehyde reacted.

*Example 2.*—2000 parts of phenol, 1300 parts of a 37% aqueous solution of formaldehyde and 20 parts of oxalic acid are reacted with constant agitation under reflux conditions at atmospheric pressure for about 3¾ hours to combine all the formaldehyde. The pH at the end of the reaction is increased to about 5.1 by the addition of 52.0 parts of $Ba(OH)_2.8H_2O$ dissolved in 150 parts of water and the volatile removed at atmospheric pressure by heating it to 170° C. whereupon 400 parts of oiticica oil are added with constant agitation. The heating is continued until the temperature reaches 260° C. and the mixture is held at this temperature for 15 minutes until it becomes clear. An additional 400 parts of oiticica oil are then added, the mixture heated to 260° C., held at this temperature for 10 minutes until the resin oil mixture becomes clear, and then the resin is poured into cooling pans to yield about 2860 parts by weight of an oil-modified resin product containing about 28% of oil and melting at 93° C. This product can be ground to a 200-300 mesh powder which is substantially non-sintering at 30-35° C.

Instead of oxalic acid, phenol sulphonic acid can be used, but a darker colored resin results with this catalyst. Moreover, a hydrogen ion concentration as low as 3.8 can be used.

*Example 3.*—2000 parts of phenol, 1100 parts of a 37% aqueous solution of formaldehyde and 20 parts of oxalic acid are reacted with constant agitation under reflux conditions at atmospheric pressure for about 2¾ hours to complete disappearance of the formaldehyde. The pH at the end of the reaction is increased to about 4.7 by the addition of 51.3 parts of Ba(OH)$_2$.8H$_2$O dissolved in 150 parts of water and the mixture is then dehydrated at atmospheric pressure by heating it to 170° C. 400 parts of China-wood oil are added with constant agitation while the mixture is heated to 270° C., and it is held at this temperature for 20 minutes until the resin oil mixture becomes clear. An additional 400 parts of China-wood oil are then added, the mixture heated with further agitation to 250-255° C., held there for 5 minutes and then put under a vacuum of 25 inches while holding the mixture at 250° C. for 15 minutes until a resin sample becomes very brittle on cooling; the product is then poured into cooling pans to yield 2584 parts by weight of an oil-modified resin melting at 93° C. and containing about 30.9% of China-wood oil. The product can be ground to a 200-300 mesh powder which is substantially non-sintering at 30-35° C.

*Example 4.*—75 parts of cresol, 41.25 parts of a 37% aqueous solution of formaldehyde and 0.75 part of oxalic acid are reacted with constant agitation and under reflux conditions at atmospheric pressure for 6 hours at a pH of about 1.2. The pH at the end of the reaction is increased in the usual manner to about 4.5, particularly when large quantities, such as upwards of 1000 pounds, of resin are being prepared. When smaller quantities of resin are being prepared, neutralization of the reaction mass can be omitted, especially when the amount of oil added does not exceed 30% of the weight of the resin and when the additions are made in comparatively small batches. This mixture is dehydrated, preferably to a temperature of 160-170° C. and 19.8 parts of oil are added while the temperature is held at 170° C. The oil resin mixture is then further heated to 290-295° C. and maintained at this temperature for about 20 minutes whereupon it is subjected to distillation under a vacuum of about 26-28 inches while holding it at 290° C. for from 10 to 60 minutes or until a resin sample becomes brittle on cooling; this resin is then poured into cooling pans to yield a clear, light-colored, brittle product melting at about 105° C. It can be readily ground to a 200 mesh powder which is substantially non-sintering.

Although the specific examples disclose grindable oil-modified resins which are capable of being incorporated as binders for various fillers in the fabrication of dry moldable friction elements, these modified resins are also particularly well adapted for the preparation of various other molding materials, especially molded parts fitted with metal inserts. Such resins have sufficiently rapid hardening properties for holding when a hardening agent is added and yet retain sufficient flow and flexibility to avoid cracking of the resin in the vicinity of inserts. In addition, they have great tensile strength and excellent electrical properties. The modified resins can also be used as binders in the preparation of abrasive wheels.

It is to be understood that the examples given herein are merely illustrative of this invention which may be variously otherwise embodied, as by utilizing other modifying oils, including the numerous commercially available drying and non-drying oils or by adding these oils all at one time instead of in small portions, all within the scope of the appended claims.

What is claimed is:

1. Method of preparing a composition suitable as a binder in a dry-process molded friction element which comprises reacting a mol of a phenol with 0.575 to 0.8 mol of formaldehyde in the presence of an acid catalyst until the formaldehyde has combined to form a resin, adjusting the pH of the reaction mass to within a range of 2.3 to 8.25, dehydrating, incorporating with the resin a vegetable oil in amount up to 50 per cent by weight of the resin, heating until a sample becomes brittle on cooling with a melting point of 80° C. or above and grindable to a fineness of 200 mesh or finer without sintering on standing at room temperature, and adding from 2 to 15 per cent of a hardening agent to make the composition thermo-setting under molding conditions of heat and pressure.

2. Method of preparing a composition suitable as a binder in a dry-process molded article which comprises reacting a mol of a phenol with from 0.575 to 0.8 mol of an aldehyde in the presence of an acid catalyst to form a resin, adjusting the pH of the reaction mass to within a range of 2.3 to 8.25, dehydrating, incorporating with the resin a vegetable oil in amount up to 50 per cent by weight of the resin, heating until a sample becomes brittle on cooling with a melting point of 80° C. or above and grindable to a fineness of 200 mesh or finer without sintering on standing at room temperature, and adding a hardening agent to make the composition thermo-setting under molding conditions of heat and pressure.

3. Method of preparing a composition suitable as a binder in a dry-process molded article which comprises reacting a mol of a phenol with from 0.575 to 0.8 mol of an aldehyde in the presence of an acid catalyst to form a resin, dehydrating, incorporating with the resin a vegetable oil in amount up to 50 per cent by weight of the resin, heating until a sample becomes brittle on cooling with a melting point of 80° C. or above and in a ground form is non-sintering at room temperature, and adding a hardening agent to make the composition thermo-setting under molding conditions of heat and pressure.

4. A dry-process molded friction element comprising in combination a filler of asbestos and a reinforcing agent and a binder therefor in the proportions of from 55 to 75 per cent of asbestos and from 15 to 25 per cent of reinforcing agent to 15 to 25 per cent of the binder, said binder comprising the heat-hardened product of a hardening agent and a composition of a dehydrated acid-catalyzed phenol-aldehyde resin having from 0.575 to 0.8 mol of aldehyde reacted in for each mol of the phenol and a pH adjusted within a range of from about 2.3 to 8.25 with a vegetable oil in amount up to 50 per cent by weight of the resin and brought to a brittle state with a melting point of 80° C. or above and characterized by grindability to about 200 mesh or finer without sintering at room temperature.

5. A dry-process molded article comprising in combination a filler and a binder therefor comprising the heat-hardened product of a hardening agent and a composition of a dehydrated acid-catalyzed phenol-aldehyde resin having from 0.575 to 0.8 mol of aldehyde reacted in for each mol of the phenol with a vegetable oil in amount up to 50 per cent by weight of the resin and brought to a brittle state with a melting point of 80° C. or above and characterized in ground form by non-sintering at room temperature.

6. A dry-process molded article comprising in combination a filler and a binder therefor comprising the heat-hardened product of a hardening agent and a composition of a dehydrated acid-catalyzed phenol-aldehyde resin having from 0.575 to 0.8 mol of aldehyde reacted in for each mol of the phenol with a vegetable oil brought to a brittle state with a melting point of 80° C. or above and characterized in ground form by non-sintering at room temperature.

7. Composition suitable as a binder in a dry-process molded friction element comprising in combination a hardening agent and a composition of a dehydrated acid-catalyzed phenol-aldehyde resin having from 0.575 to 0.8 mol of aldehyde reacted in for each mol of the phenol and a pH adjusted within a range of from about 2.3 to 8.25 with a vegetable oil in amount up to 50 per cent by weight of the resin and brought to a brittle state with a melting point of 80° C. or above and characterized by grindability to about 200 mesh or finer without sintering at room temperature.

8. Composition suitable as a binder in a dry-process molded article comprising in combination a hardening agent and a composition of a dehydrated acid-catalyzed phenol-aldehyde resin having from 0.575 to 0.8 mol of aldehyde reacted in for each mol of the phenol with a vegetable oil in amount up to 50 per cent by weight of the resin and brought to a brittle state with a melting point of 80° C. or above and characterized in ground form by non-sintering at room temperature.

9. Composition suitable as a binder in a dry-process molded article comprising in combination a hardening agent and a composition of a dehydrated acid-catalyzed phenol-aldehyde resin having from 0.575 to 0.8 mol of aldehyde reacted in for each mol of the phenol with a vegetable oil and brought to a brittle state with a melting point of 80° C. or above and characterized in ground form by non-sintering at room temperature.

10. Method of preparing a composition suitable as a binder in a dry-process molded friction element which comprises reacting a mol of phenol with from 0.6 to 0.7 mol of formaldehyde at reflux temperature until substantially all of the formaldehyde has combined in the presence of an acid catalyst, adjusting the pH of the mass to about 3.8 to 5.1, dehydrating and removing volatiles, incorporating a vegetable oil in amount up to 50 per cent by weight of the resin, heating until a sample becomes brittle on cooling with a melting point of 80° C. or above and grindable to a fineness of 200 mesh without sintering on standing at room temperature, and adding a hardening agent in amount to obtain a composition that is thermosetting under molding conditions of heat and pressure.

11. Method of preparing a composition suitable as a binder in a dry-process molded friction element which comprises reacting a mol of cresol with from 0.575 to 0.8 mol of formaldehyde at reflux temperature until substantially all of the formaldehyde has combined in the presence of an acid catalyst, dehydrating until substantially all the water has been removed, incorporating a vegetable oil in amount up to 30 per cent of the weight of the resin, heating until a sample becomes brittle on cooling with a melting point of 80° C. or above and grindable to a fineness of 200 mesh without sintering on standing at room temperature, and adding a hardening agent in amount to obtain a composition that is thermosetting under molding conditions of heat and pressure.

VIRGIL E. MEHARG.
ARTHUR P. MAZZUCCHELLI.